United States Patent [19]
Kelly

[11] Patent Number: 5,980,612
[45] Date of Patent: Nov. 9, 1999

[54] ADSORBENT ACTIVATED CARBON FIBER SHEET FILTER AND METHOD OF REGENERATION

[75] Inventor: Timothy M. Kelly, Lake Orion, Mich.

[73] Assignee: Compliance Environmental Management, Inc., Auburn Hills, Mich.

[21] Appl. No.: 09/010,364

[22] Filed: Jan. 21, 1998

[51] Int. Cl.[6] .................................................. B01D 53/04
[52] U.S. Cl. .............................. 95/106; 95/114; 95/115; 96/126; 96/146
[58] Field of Search .............................. 95/99, 106, 107, 95/113–115; 96/122, 124–128, 146, 154

[56] References Cited

U.S. PATENT DOCUMENTS

| | | | |
|---|---|---|---|
| 3,384,976 | 5/1968 | Westeren | 96/144 X |
| 3,619,987 | 11/1971 | Colvin et al. | 55/196 |
| 4,046,525 | 9/1977 | Matsuo et al. | 55/59 |
| 4,181,513 | 1/1980 | Fukuda et al. | 96/153 |
| 4,234,326 | 11/1980 | Bailey et al. | 96/154 |
| 4,259,092 | 3/1981 | Matsuo et al. | 55/78 |
| 4,269,611 | 5/1981 | Anderberg | 96/124 |
| 4,312,641 | 1/1982 | Verrando et al. | 96/126 X |
| 4,391,616 | 7/1983 | Imamura | 55/35 |
| 4,484,938 | 11/1984 | Okamoto et al. | 96/154 X |
| 4,595,575 | 6/1986 | Oeste et al. | 95/107 X |
| 4,846,855 | 7/1989 | Tsujimoto | 55/60 |
| 4,859,216 | 8/1989 | Fritsch | 55/28 |
| 4,895,580 | 1/1990 | Morioka et al. | 55/160 |
| 4,930,294 | 6/1990 | Meier | 96/122 |
| 4,946,479 | 8/1990 | Izumo | 55/181 |
| 5,017,202 | 5/1991 | Ogata et al. | 96/125 |
| 5,057,128 | 10/1991 | Panzica et al. | 55/181 |
| 5,110,328 | 5/1992 | Yokota et al. | 55/180 |
| 5,308,457 | 5/1994 | Dalla Betta et al. | 96/146 X |
| 5,429,665 | 7/1995 | Botich | 96/126 X |
| 5,458,784 | 10/1995 | Baker et al. | 210/674 |
| 5,509,956 | 4/1996 | Opperman et al. | 96/146 X |
| 5,510,063 | 4/1996 | Gadkaree et al. | 264/29.7 |
| 5,581,903 | 12/1996 | Botich | 96/126 X |
| 5,628,819 | 5/1997 | Mestemaker et al. | 96/122 |
| 5,746,807 | 5/1998 | Thelen et al. | 96/130 X |

FOREIGN PATENT DOCUMENTS

| | | | |
|---|---|---|---|
| 2107717 | 8/1972 | Germany | 96/146 |
| 3834942 | 4/1989 | Germany | 96/153 |
| 56-015828 | 2/1981 | Japan | 96/154 |
| 56-017622 | 2/1981 | Japan | 96/125 |
| 56-031423 | 3/1981 | Japan | 96/125 |
| 57-026331 | 2/1982 | Japan | 96/126 |
| 63-319022 | 12/1988 | Japan | 96/126 |

OTHER PUBLICATIONS

*The Technical Data of Activated Carbon Fabric (ACF)*, Taiwan Carbon Technology Co.Ltd, http://manufacture.com.tw/~taicarbon/.

Primary Examiner—Robert Spitzer
Attorney, Agent, or Firm—Harness, Dickey & Pierce, P.L.C.

[57] ABSTRACT

In accordance with the teachings of the present invention, an adsorbent filter having a continuous activated carbon fiber sheet is disclosed. The filter providing a frame, at least one continuous sheet of adsorbent fabric, and a plurality of supports for supporting the sheet within the frame such that contaminated fluid flows over one or more surfaces of the sheet. The contaminants being adsorbed by contact with the surface of the sheet.

24 Claims, 4 Drawing Sheets

_Fig-9_

_Fig-10_

ADSORBENT ACTIVATED CARBON FIBER SHEET FILTER AND METHOD OF REGENERATION

BACKGROUND OF THE INVENTION

1. Technical Field

This invention generally relates to a process and apparatus for adsorbing and later desorbing contaminants from a fluid stream and, more particularly, to a filter utilizing a continuous sheet of activated carbon fabric which adsorbs contaminants from a contaminant-laden fluid stream, and which later desorbs the contaminants under controlled conditions. The filter is capable of periodic removal from use and is regenerable in a controlled environment at regeneration temperatures in excess of the in-use desorbtion temperatures.

2. Discussion

The use of activated carbon to adsorb contaminants, particularly hydrocarbons and other volatile organic compounds, is known in the art of filtration. One typical approach to filtration of hydrocarbons from a fluid stream is shown in FIG. 1 and involves forcing the contaminated fluid through a sacrificial bed of granulated activated carbon or particulate filters, referred to as pre-filters, and subsequently directing the fluid through a filter having a structure, typically either a stacked corrugated structure or a monolithic structure, made of a nonconductive inorganic substrate which is coated or an organic substrate containing activated carbon surfaces.

The filter is structured such that the substrate provides a honeycomb form, or a series of tubes which are closely spaced, to provide as much surface area as possible to contact the fluid as it flows through the filter. Since the activated carbon is carried on a substrate, the surface perpendicular to the fluid flow direction must be large, or the length of the filter in the flow direction must be long, in order to provide sufficient contact surface area with the activated carbon. The contact surface area is important because the contaminants in the fluid must contact the surface of the activated carbon in order to be adsorbed and removed from the fluid stream. If sufficient contact area is not provided, the contaminants will not be adsorbed and will therefore remain in the fluid stream. Once the fluid flows through the monolithic structure of the filter, the fluid is exhausted as presumably clean fluid.

In advanced systems the monolithic filter is positioned on a rotary device which provides in-use desorption of the filter. Other systems have been utilized where there are two or more parallel filter sets. In such a system, the fluid stream is switched from the first filter set to the second filter set when the first set is saturated. As the second set adsorbs the contaminants from the fluid stream the contaminants held in the first set are desorbed. The fluid stream is switched back to the first filter set when the second filter set is saturated. This type of parallel system is less effective than the rotary systems in many or most industrial applications and has fallen into disfavor.

Figure 1:
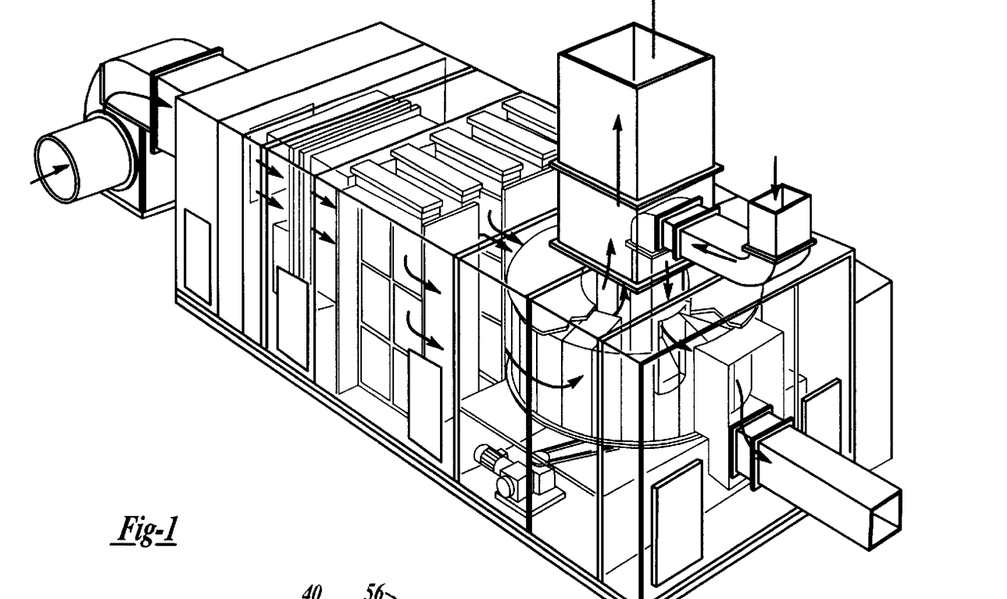
FIG. 1 is a prior art filtration system used to adsorb, and later desorb, contaminants from a fluid stream.

In the rotary type system shown in FIG. 1, the filters are positioned around the rotary device such that a channel is created in a central portion of the filters. This channel acts as a clean exhaust channel through the center of the device. A portion of the rotary device, typically positioned opposite the fluid flow entry, is shielded from the incoming fluid flow and acts as a desorption area. The desorption area is intended to drive the adsorbed contaminants from the activated carbon surfaces of the filter.

Typically, hot air is forced through the honeycomb or tube passages of the monolithic structure when the filter is rotated to the desorption area. The hot air raises the temperature of the filter structure to between about 100° C. and 180° C. The raised temperature causes some of the adsorbed contaminants to become vaporized and desorbed from the activated carbon surfaces. The vapor phase contaminants enter the flow of the hot air stream which carries the contaminants as solvent laden desorption air to a secondary operation.

The secondary operation for the filter system of FIG. 1 is typically a thermal oxidizer or a condensation system. The thermal oxidizer heats the contaminants to a point where the molecular chain of the contaminants are broken apart and form non-hazardous molecules which can be safely discharged into the environment. The condensation system is used to cool the hot solvent laden air and collect the contaminants in liquid form as they condense from the air stream. The contaminants can then be processed for commercial use, can be further filtered and treated, or can be properly disposed.

One disadvantage of utilizing a hot air stream to desorb the contaminants from the filters is that the heat transfer properties of air are relatively inefficient. Another process for desorbing the contaminants from the filters has been the suggested use of electrical heating of the filter structure itself. This advantageously allows for a lower volume of air flow to carry the desorbed contaminants to the secondary operation.

Even though heating the filter structures to a temperature in the range of 100° C. to 180° C. liberates many of the contaminants from the filter, there is an ongoing problem with high boiling point contaminants which are not desorbed at these temperatures. High temperature boiling point contaminants are considered to include contaminants which have a boiling point above the in use heating temperature used in the present systems. As a result of leaving the high boiling point contaminants in the filter, the efficiency of the filter decreases over time. By leaving the high boiling point contaminants in the filter the effective surface area available to adsorb the contaminants as they flow through the filter is reduced and more contaminants will exit the filter and be exhausted into the environment.

A portion of this problem can be attributed to the materials used to form the structure of the filter. This problem is particularly prevalent in monolithic and corrugated structures which require the use of resins or binders. If the in use temperature of desorption were raised to a level which would desorb or pyrollize the high boiling point contaminants (i.e. 600° C. or more), the binders used to form the structure of the filter would experience structural decomposition and would fail to properly support the honeycomb or tube formation required to allow fluid flow through the filter. It is further recognized that no heat source or method is presently used which can heat the filter to a temperature high enough, and in a short enough time period, to drive off all of the high boiling point contaminants during the in use desorption phase of the filtration system without structural decomposition.

SUMMARY OF THE INVENTION

In accordance with the teachings of the present invention, there is provided an adsorbent filter for adsorbing contaminants from a fluid stream. The filter provides a continuous sheet of adsorbent fabric which is located within a frame and extends between alternating first and second supports located generally opposite one another. The supports suspend each crossing layer of the fabric sheet in proximity to an adjacent crossing layer such that flow channels are formed therebetween. The contaminated fluid flows within the flow channels and over the surface or surfaces of the fabric sheet. The contaminants are adsorbed by the activated carbon fibers from which the fabric sheet is made.

It is an object of the present invention to provide a more compact and/or more efficient adsorbent filter than the present monolithic or corrugated paper type adsorbent filters. This object is believed to be achieved by utilizing a sheet of fabric which is constructed of substantially all activated carbon fibers. The elimination of a substrate should allow for a filter which provides an equivalent amount of adsorption in an equal or smaller volume.

It is a further object of the present invention to provide an adsorbent filter which can be subjected to higher temperatures than presently produced filters without experiencing structural degradation which would hinder the filters continued usefulness. The higher temperatures allow desorption of the high boiling point contaminants which have been adsorbed. This is achieved by providing a filter having a filter sheet made of substantially all activated carbon fibers which do not require binders or resins to form the channels through which the contaminated fluid flows.

It is a further object of the present invention to provide a means of heating the adsorbent filter to a desorption temperature sufficiently high to force substantially all of the high boiling point contaminants into a gas phase during the normal in use desorption stage of the filtration system.

A further object of the present invention is to provide a method and apparatus for regenerating filters which have been used to adsorb contaminates from a fluid stream. The regeneration is achieved under controlled conditions which remove substantially all of the adsorbed contaminates and provide a filter having adsorption capacities which are substantially equal to a filter which has not been exposed to a contaminated fluid stream.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is in no way intended to limit the invention or its application or uses.

Figure 2:
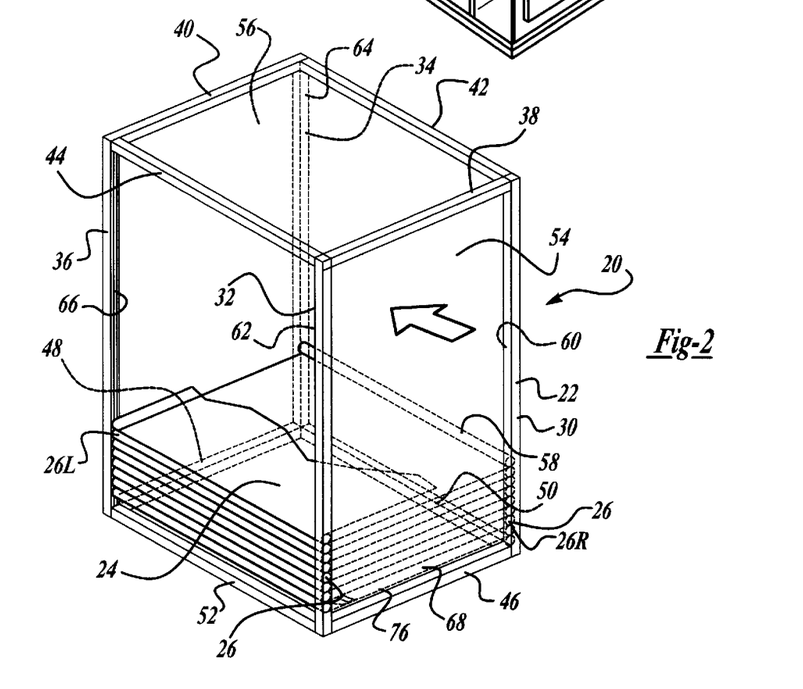
FIG. 2 is a perspective view of a filter having a continuous fabric sheet made of substantially all activated carbon fibers and being made in accordance with the teachings of the present invention.

Referring to FIG. 2, there is shown an adsorbent filter, generally at 20. Filter 20 includes a frame 22, a continuous adsorbent fabric sheet 24, and supports 26. Frame 22 is preferably made of a stainless steel material which provides a durable, chemically resistant structure. Alternate materials such as coated metals, chemically resistant plastics or resins, ceramic composite materials, or similar durable, chemically resistant materials able to withstand temperatures of 600° C. or more without structural or dimensional degradation can also be used with equal results. These temperatures may be reached in a conventional or an inert atmosphere depending upon the application of the present invention.

Frame 22 of the preferred embodiment is a generally rectangular shaped cube having an upstream right side member 30, an upstream left side member 32, a downstream right side member 34, a downstream left side member 36, an upstream top member 38, a downstream top member 40, a right side top member 42, a left side top member 44, an upstream bottom member 46, a downstream bottom member 48, a right side bottom member 50, and a left side bottom member 52. During use of the filter the contaminated fluid flow enters filter 20 through an upstream plane 54 (defined by members 30, 32, 38, and 46), flows over the surfaces of sheet 24 which adsorbs the contaminants, and the cleaned fluid exits through a downstream plane 56 (defined by members 34, 36, 40, and 48).

Figure 9:
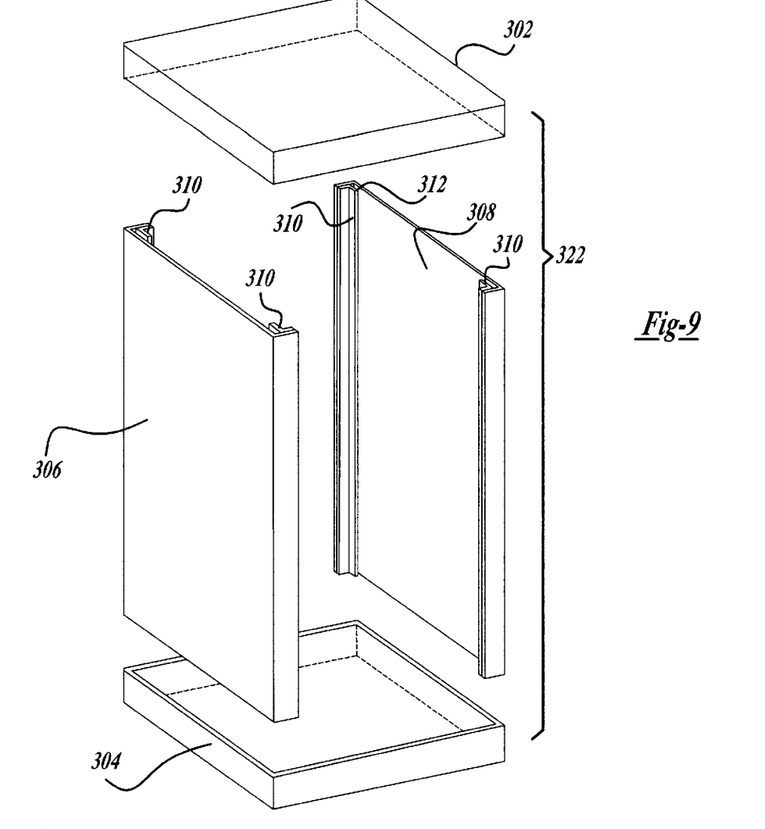
FIG. 9 is an exploded view of a further preferred embodiment of the filter frame of the present invention.
Figure 10:
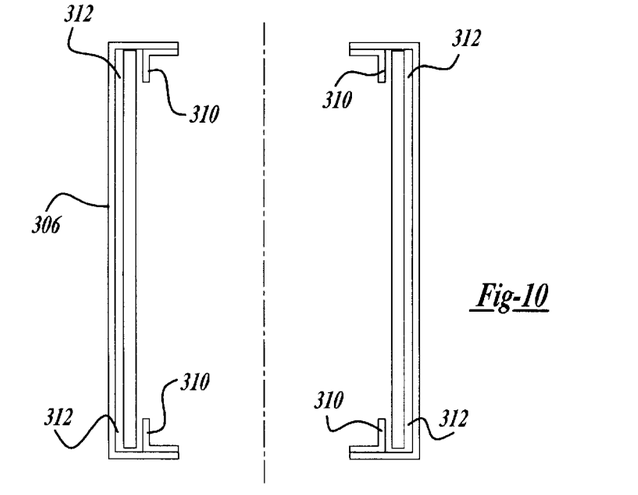
FIG. 10 is a plan view of the filter frame of FIG. 9 including the positioning of the supports of the present invention.

Referring to FIGS. 9 and 10, there is shown a further preferred embodiment of the frame 322 of filter 20. Frame 322 includes an upper cap portion 302, a lower cap portion 304, a left side member 306, and a right side member 308. Cap portions 302 and 304 may be symmetrically opposite, identical, or dissimilar from one another depending upon the system the filter 20 is to be used. Preferably cap portions 302 and 304 are identical and therefor require only one set of tools to produce. Further, the caps may be made of a nonconductive material and act as an insulator if electrical current will be utilized in the regeneration process as discussed later.

Side members 306 and 308 may also be symmetrically opposite, identical, or dissimilar from one another. Each side member includes a bracket structure 310 which is attached to or formed as part of the side member. The purpose of the bracket structure is to create a channel 312 for receiving a support means as will become apparent from further review of the first preferred embodiment.

Referring again to FIG. 2, adsorbent fabric sheet 24 of the preferred embodiment is made of woven fibers of polyacrylonitrile (PAN) which are then heat treated in the process of carbonization and activation. This method of producing the fabric sheet provides significantly more activated carbon adsorption area than is provided by a cloth which is impregnated with or coated by granular activated carbon. Other materials which can be used to produce the woven fibers used to form fabric sheet 24 include, but are not limited to: Rayon; Pitch, Phenol; Lignin; Saran; or any other naturally occurring or man made fiber which can be carbonized and activated. Further, while the preferred embodiment utilizes a fabric sheet which is woven the filter of the present invention can use a sheet material which is produced by other methods provided the tensile requirements (discussed later) can be achieved. In general, the manufacture of activated carbon fibers requires heat decomposing the polymer material, such as PAN, in an inert gas and then activating the fibers in a carbon dioxide concentrated or steam atmosphere at a high temperature.

The tensile strength of the activated carbon fiber fabric sheet 24 along a length of the fabric, or in the direction of the warp fibers, is sufficiently high that as sheet 24 is extended across frame 22 a tensile force of approximately 0.75 kg/cm$^2$ (10.67 psi) can be applied which prevents sagging of sheet 24 while not damaging the fibers of sheet 24. The tension which is applied to sheet 24 keeps sheet 24 in a substantially planar condition as the sheet 24 extends across frame 22. The dimensional stability of sheet 24 along a width of the fabric, or in the direction of the weft fibers, is preferably controlled such that little or no sagging is allowed in the direction of flow when the sheet 24 is tensilely loaded at approximately 0.25 kg/cm$^2$ (3.56 psi) in the direction of the weft fibers. As will be detailed below, the spacing between successive layers of sheet 24 as it extends across frame 22 is generally between 1 and 4 millimeters. The preferred embodiment will be described as providing a spacing of 2 mm although applications where spacings of less than 1 mm, or greater than 4 mm are envisioned by the inventor and are within the scope of this disclosure and claimed invention.

The spacing between each crossing layer 76 of sheet 24 is designed to encourage, either alone or jointly with non-laminar flow enhancement devices, substantially all of the fluid flowing through filter 20 to come in contact with a surface of sheet 24. By contacting the surface of sheet 24 the contaminants in the fluid, particularly hydrocarbon's in the preferred embodiment, are adsorbed by the activated carbon fibers of sheet 24. The term 'hydrocarbon' within the text of this specification includes, but is not limited to, VOCs, halogenated hydrocarbons, hydrocarbons and other pollutants and/or products whose absorption is common to those skilled in the art.

If design constraints or other reasons require or make it desirable to provide a large spacing between each crossing layer 76 of sheet 24, non-laminar or turbulent flow of the fluid through the flow channels 68, created between each pair of transverse crossing layers 76, can be enhanced by controlling the orientation of a series of sheets 24, by varying the surface texture or weave of sheet 24, or by adding physical mixers either within flow channels 68 or to the upstream plane 54 or downstream plane 56 of filter 20. These alternatives will be further detailed below.

Figures 3, 4, 5, 6:
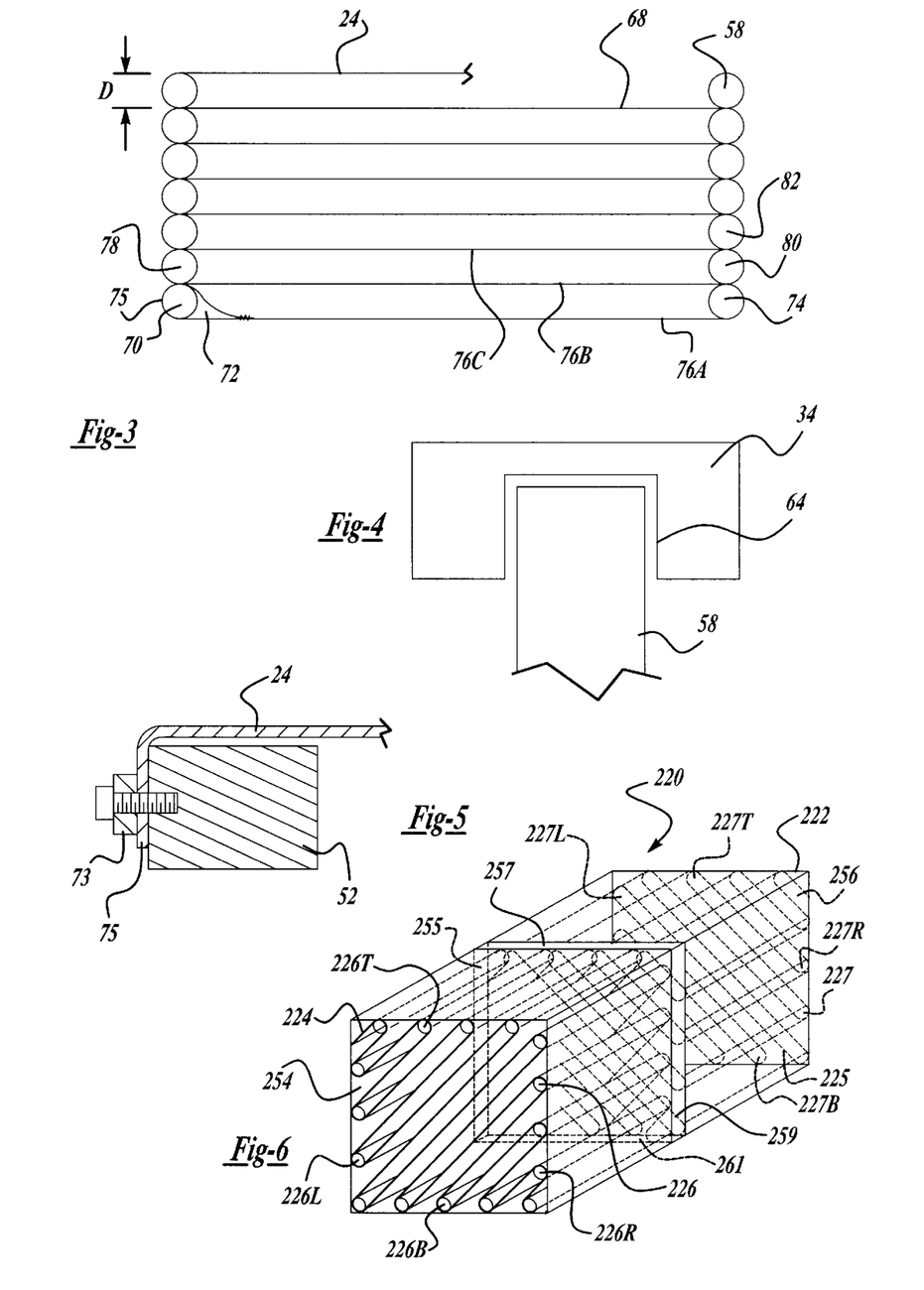
FIG. 3 is a detailed view of a portion of the filter of FIG. 2.
FIG. 4 is a detailed plan view of a portion of the filter shown in FIG. 2.
FIG. 5 is a detailed view of an alternate retention means for securing the continuous fabric sheet to the frame of a filter made in accordance with the present invention.
FIG. 6 is an alternate embodiment of a filter made in accordance with the teachings of the present invention.

In the preferred embodiment, shown in FIGS. 2, 3, and 4, supports 26 are shown as extending from the upstream right side member 30 to the downstream right side member 34 and from the upstream left side member 32 to the downstream left side member 36. The supports extending between member 30 and member 34 will be referred to as right side supports 26R, while the supports extending between member 32 and member 36 will be referred to as left side supports 26L. In the present embodiment the supports 26 are shown as a series of elongated generally circular rods 58 having each end restrained in a channel 60, 62, 64, or 66, within side members 30, 32, 34, and 36, respectively. A detail of rod 58 placed in channel 64 of member 34 is shown in FIG. 4. The rods 58 have a diameter, D, which is equal to the desired spacing of each flow channel 68. The spacing of flow channel 68 in the preferred embodiment is 2 mm as previously noted and therefore rods 58 would have a diameter, D, of 2 mm. Supports 26 can be of a wide variety of shapes including, but not limited to, oval, triangular, or square. The only constraint to the configuration of the supports is that, when installed, the sheet 24 is allowed to be placed under a tensile force sufficient to remain generally planar, and the resultant spacing between each consecutive crossing layer 76 is the desired spacing to create the flow channel 68.

As shown in FIG. 3, sheet 24 of the preferred embodiment is secured to the lowest rod 70 of left side support 26L. Sheet 24 can be wrapped around rod 70 and stitched to itself to form a pocket 72 or pocket 72 can be formed prior to inserting rod 70. Further, sheet 24 can be fastened to rod 70 by any chemical or mechanical means which is compatible with the materials of the rod and the sheet, and which means can withstand the temperatures, environment, and contaminants to which filter 20 will be exposed. Sheet 24 can also be secured directly, or indirectly by way of retainer strip 73, to a frame member such as member 42, 44, 50, or 52. Use of strip 73 is shown in FIG. 5.

Once sheet 24 is secured along a first end 75, the sheet 24 is drawn across frame 22 toward right side support 26R and the lowest rod 74 of the right side support 26R is lowered into channels 60 and 64 and rests on top of sheet 24. This creates a first transverse crossing layer 76A of sheet 24. The sheet 24 is then wrapped over rod 74 of right side support 26R and is drawn back across frame 22 toward the left side support 26L where the next rod 78 is lowered into channels 62 and 66 and rests on top of sheet 24 thereby creating a second transverse crossing layer 76B of sheet 24. The sheet 24 is wrapped around rod 78 and again drawn across frame 22 toward right side support 26R. Prior to sheet 24 reaching right side support 26R, a spacer rod 80 is inserted into channels 60 and 64. Sheet 24 is then extended beyond right side support 26R and the next consecutive rod 82 is lowered into channels 60 and 64, thereby creating a third transverse crossing layer 76C. Sheet 24 is then wrapped around rod 82 and is again drawn toward left side support 26L. The process of inserting a spacer rod, passing the sheet through the support, and inserting the next consecutive rod is repeated on both the left and right sides of frame 22 until sheet 24 is serpentined back and forth between the left side support 26L and the right side support 26R to the top of members 30, 32, 34, and 36. As a result of this serpentine formation, a plurality of transverse crossing layers 76 are created. Each adjacent set of crossing layers 76 create flow channels 68 which extend the width of sheet 24. In the preferred embodiment sheet 24 is substantially the same width as filter 20 is deep in the flow direction which extends from upstream plane 54 to downstream plane 56.

While the above described construction of filter 20 will be utilized in describing the preferred embodiment, one skilled in the art will readily recognize that other methods and structures can be used to form filter 20 having a continuous adsorbent fabric sheet which is serpentine to create flow channels for adsorbing contaminants from the fluid flow.

One significant advantage of utilizing activated carbon fabric sheet 24 in filter 20 over using monolith or corrugated type filters of the prior art is that the activated carbon fabric sheet 24 in filter 20 does not require a binder. The prior art filters use a binder, typically a resin based binder, to form the substrate upon which a coating of activated carbon is placed. In order to drive off high boiling point volatile organic compounds, which are adsorbed during use of the filter, temperatures of up to 600° C. or more may be required. If the monolith or corrugated structure is utilized, the resin used to form the substrate will generally experience structural decomposition at temperatures in this range. As such, once the monolith or corrugated filter is saturated with high boiling point hydrocarbon's it must generally be discarded and replaced since the high boiling point hydrocarbon's cannot be driven off without degrading the structure of the substrate. Since the activated carbon fabric used to form sheet 24 contains no binders or resins, high boiling point hydrocarbon's can be driven off at temperatures of 600° C. or more without degrading adsorptive sheet 24. Again, these temperatures may be reached in a conventional or an inert atmosphere depending upon the application of the present invention.

During normal on-site use, filter 20 is typically desorbed at a temperature of approximately 175° C. which is similar to several current hydrocarbon filter systems. However, the present filter has the advantage of being regenerated to a near original condition at a location remote from the filtration system in which filter 20 is incorporated. The remote location may be on-site for a large commercial complex, or may be an off-site facility. The filter 20 will be removed and regenerated on a time basis (i.e. a specific number of hours of use) or when sensors incorporated in the filtration system or other performance measurements external to the filters indicate the adsorption capabilities of the filter are diminished. The capabilities of the filter will generally be diminished by an accumulation of high boiling point hydrocarbon's which are not fully liberated and desorbed at the normal use desorption temperatures.

Figures 7, 8:
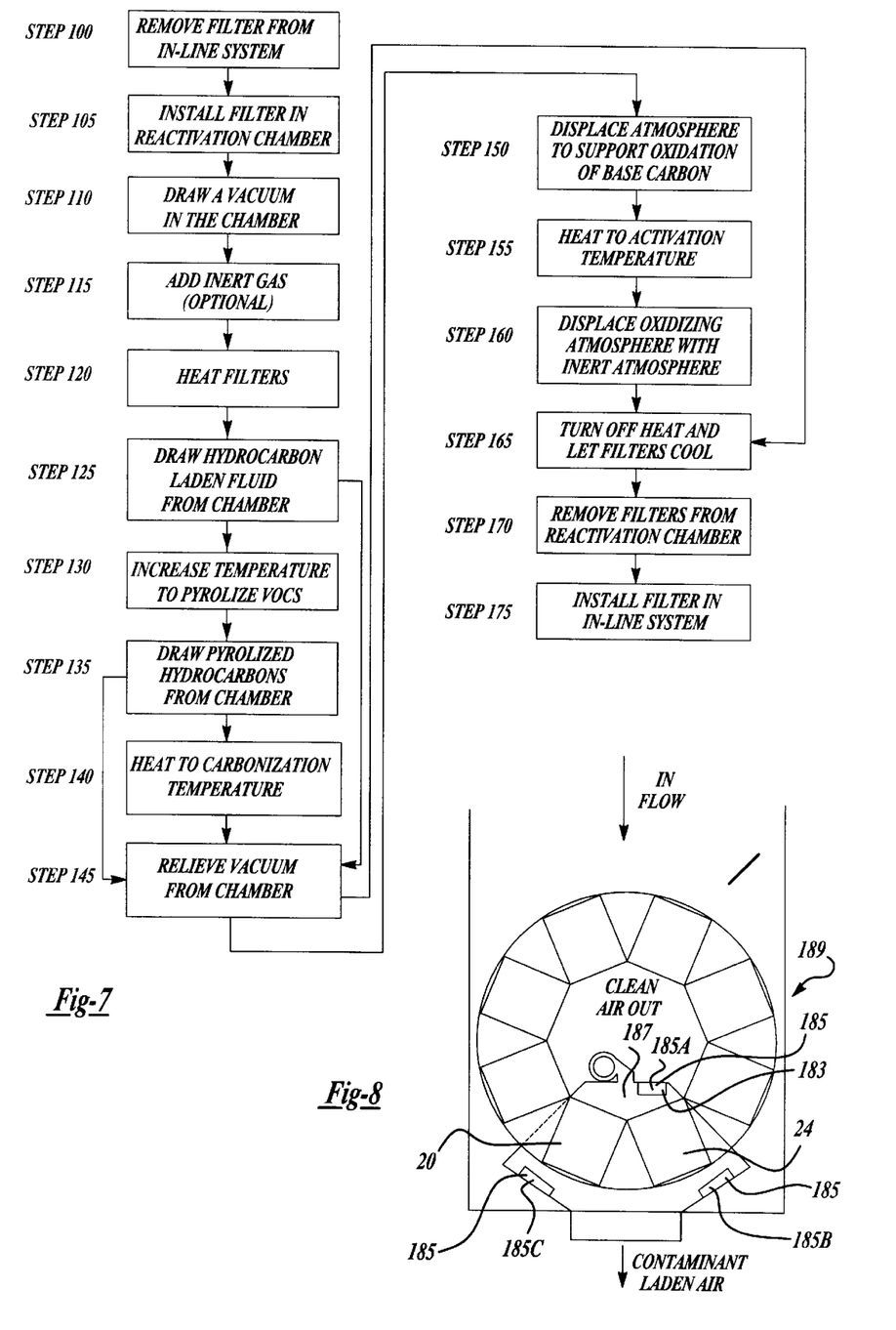
FIG. 7 is a flow chart of a regeneration process taught in the present invention and used to regenerate filters used to adsorb contaminates from a contaminated fluid flow.
FIG. 8 is a plan view of a desorption portion of a filtration system incorporating an energy generator as a heat source made in accordance with the teachings of the present invention.

The regeneration process utilized with the filter of the present invention is shown in the flow chart of FIG. 7 and includes the steps of removing (step 100) the filter 20 from the on-site in-line filtration system in which it is utilized. The filter 20 is then installed (step 105) in the reactivation chamber. The reactivation chamber is functionally capable of supporting filter reactivation operations that may include drawing a vacuum, controlling the mixture of gases in the atmosphere and heating the reactivation chamber to high temperatures. The reactivation chamber may be on-site at large commercial industrial facilities where a multitude of in-line filter systems are used, or the reactivation chamber may be at a remote off-site facility specifically designed to regenerate the filters of the present invention. After one or more of the filters 20 have been installed in the reactivation chamber, one or more of the following operations will be performed in sequence; desorption of hydrocarbons, pyrolysis of organics, carbonization of organics and filter 20, and activation of filter 20.

To perform the operation of hydrocarbon desorption, the pressure within the chamber is brought down such that a vacuum, in the range of 24 inches of mercury, is present (step 110). While vacuum is employed in the preferred embodiment, the regeneration process can be accomplished at ambient atmosphere pressure. The vacuum, if employed, serves two purposes. First, the high boiling point hydrocarbons are desorbed more readily from the activated carbon fiber fabric sheet 24 in the presence of such a vacuum. Second, there is a reduced risk of oxidation which, if the oxidation occurs at a high rate, can cause a fire. Inert gas can, but need not, be added (step 115) to the vacuum chamber. The inert gas creates an inert atmosphere in which the vaporization can occur which further suppresses the oxidation and possible risk of fire. It should be noted that other oxygen depleted atmospheres can be created within the chamber in place of an inert atmosphere and achieve equal results. The filters 20 which have been placed in the reactivation chamber are then heated (step 120) to a specified temperature by a heat source. The specified temperature is higher than the desorption temperature experienced during normal use of the filter in the in-line filter system. The range of temperatures for desorption in the reactivation chamber is typically from, but not limited to, 180° C. to 400° C. The preferred embodiment uses a regenerative desorption temperature of approximately 350° C. The filters 20 are exposed to the high temperature for a fixed period of time or, if appropriate sensors are installed within the reactivation chamber, until the release of hydrocarbons from the filters is sufficiently low.

Once substantially all of the hydrocarbons have been desorbed from the sheet 24 the vaporized hydrocarbons, which are volatilized and/or decomposed, are drawn out of the chamber (step 125). This is preferably achieved by creating a small flow of fluid through the chamber, the fluid which is drawn out of the chamber is considered to be heavily laden with hydrocarbons. This heavily laden fluid is typically either passed through a condenser, at which point the hydrocarbons are cooled and condensed in a liquid state which can be recovered for commercial use or proper disposal, or the fluid is passed through a thermal oxidizing unit where the hydrocarbons are heated to a temperature where they oxidize or are reduced by catalysis to a form which can be safely discharged.

Once the hydrocarbon concentration in the heavily laden fluid is determined to be an acceptably low level, the desorption process has been completed. After desorption of the hydrocarbons, the regeneration of filter 20 may be complete or the regeneration process may be continued. If the regeneration process is completed after the hydrocarbon desorption process, the current of fluid is discontinued and the vacuum is fully relieved from the vacuum chamber (step 145). The heat source is generally deactivated (step 165) once the hydrocarbon concentration is determined to be at an acceptable level thereby allowing the filters to cool as the pressure returns to atmospheric pressure within the vacuum chamber. Once the filters have cooled, they are removed (step 170) from the reactivation chamber and are in a regenerated state which is near original. The regenerated filters can be returned to the same or a different in-line filter system (step 175) with performance levels substantially equal to that of a new filter made in accordance with the teaching of the present invention.

After the process of hydrocarbon desorption, processing may be continued to include pyrolysis. To perform pyrolysis, the vacuum and/or existing atmosphere is maintained and the temperature is increased to a specified temperature by a heat source (step 130). The specified temperature for pyrolysis is higher than the temperature for desorption. The range of temperatures for pyrolysis is typically from, but not limited to, 400° C. to 815° C. The preferred embodiment uses a pyrolysis temperature of approximately 600° C. The filters 20 are exposed to the pyrolysis temperature for a fixed or variable period of time. Volatilized hydrocarbons that result from pyrolysis are drawn out of the chamber by creating a small flow of fluid as described during hydrocarbon desorption (step 135). The volatilized hydrocarbons resulting from pyrolysis are typically either passed through a condenser, at which point the hydrocarbons are cooled and condensed in a liquid state which can be recovered for commercial use or proper disposal, or the fluid is passed through a thermal oxidizing unit where the hydrocarbons are heated to a temperature where they oxidize or are reduced by catalysis to a form which can be safely discharged.

After pyrolysis of the hydrocarbons, filter 20 may be completely processed or the process may be continued to include further steps. If regeneration is completed after the pyrolysis process, the vacuum is fully relieved from the reactivation chamber (step 145) and the heat source is deactivated (step 165) allowing the filters to cool as the pressure returns to atmospheric pressure within the vacuum chamber. Once the filters have cooled, they are removed (step 170) from the reactivation chamber and are in a regenerated state which is near original. The reactivated filters can be returned to the same or a different in-line filter system (step 175) with performance levels substantially equal to that of a new filter made in accordance with the teaching of the present invention.

After the process of pyrolysis, regeneration may be continued by performing the carbonization process. To perform carbonization, the vacuum and/or existing atmosphere is maintained and the temperature is increased to a specified temperature by a heat source (step 140). The specified temperature for carbonization is higher than the temperature for pyrolysis. The range of temperatures for carbonization is typically from, but not limited to, 600° C. to 1300° C. The preferred embodiment uses a carbonization temperature profile ranging from approximately 650° C. to 750° C. The filters 20 are exposed to the carbonization temperature for a fixed or variable period of time. After exposure for the appropriate period of time, the carbonization process has been completed.

After carbonization of the hydrocarbons and/or filters 20, the regeneration of filter 20 may be complete or the regeneration process may be continued. If the process is completed after the carbonization process, the vacuum is fully relieved from the reactivation chamber (step 145) and the heat source is deactivated (step 165) allowing the filters to cool as the pressure returns to atmospheric pressure within the reactivation chamber. Once the filters have cooled, they are removed (step 170) from the holding fixture and are in a regenerated state which is near original. The regenerated filters can be returned to the same or a different in-line filter system (step 175) with performance levels substantially equal to that of a new filter made in accordance with the teaching of the present invention.

After the process of carbonization, the regeneration process cycle may be continued by performing the activation process. To perform activation the existing atmosphere is displaced with an oxidizing atmosphere which supports activation (step 150). The oxidizing atmosphere may consist of steam, carbon dioxide, flue gas, air, or any other atmosphere known for use in activation to one in the art. The pressure of the atmosphere within the reactivation chamber may be a vacuum, at ambient pressure, or may be pressurized. The temperature is then increased by a heat source to a specified temperature to oxidize char in the carbon substrate pore structures (step 155). The specified temperature for activation is typically higher than the temperature for carbonization. The range of temperatures for carbon activation is typically from, but not limited to, 600° C. to 1100° C. The preferred embodiment uses an activation temperature profile ranging from approximately 680° C. to 950° C. The filters 20 are exposed to the activation temperatures and activation atmosphere for a fixed or variable period of time. After exposure for the appropriate period of time, the activation process has been completed.

After activation of the carbon substrate, the full regeneration process cycle is complete. The atmosphere which supports activation is replaced with an inert atmosphere (step 160), which stops further base carbon oxidation, and the heat source is deactivated (step 165) allowing the filters to cool as the pressure returns to atmospheric pressure within the vacuum chamber. Once the filters have cooled, they are removed (step 170) from the holding fixture and are in a regenerated state which is near original. The regenerated filters can be returned to the same or a different in-line filter system (step 175) with performance levels substantially equal to that of a new filter made in accordance with the teaching of the present invention.

By utilizing filters that can be regenerated and/or reactivated, the use of sacrificial carbon beds which are generally required in prior art systems and are located upstream of the prior art type of filter, can be avoided with a resultant cost and environmental savings.

The heat source used to heat the filters 20 during use in the in-line filter system or during the regeneration process can take a variety of forms. First, gas-fired, electrical, or other forms of heaters can be used to heat a stream of fluid, generally air, which is forced over sheet 24 of filter 20. The heat transfer properties of forced air heating is relatively inefficient and would typically require the use of a thermal oxidizer during use with the in-line filter system. Forced air heating can also be utilized in the vacuum chamber applications of the regeneration but the heat transfer limitations are magnified by the substantially higher temperatures which the filters must be exposed in order to be regenerated. Further, convection based heating is limited in applicability when used in a vacuum.

A second form of heat source is the use of electrical current provided directly to the activated carbon fabric sheet 24. The direct heating of sheet 24 by electrical contact may be used during the in-use desorption phase of the in-line filter system or during the regeneration process described above. Sheet 24, made of activated carbon fibers, is itself electrically conductive and no additional electrically conductive elements or strips need to be incorporated within or attached to the sheet 24 other than the leads from the current source. Further, the conductivity of localized areas of sheet 24 is generally dependent upon the amount of contaminants (i.e. hydrocarbons or other volatile organic compounds) which have been adsorbed. Generally the more contaminants adsorbed per unit volume of the sheet in a local area the more electrically conductive the area should be. As such, the localized areas having the greatest concentration of adsorbed contaminants will be more conductive and will be heated to a high temperature faster because of the direct electrical resistive heating. As the contaminants are desorbed and liberated from the sheet 24, the conductivity will tend to equalize across the sheet and substantially uniform heating to a specified temperature will occur over the entire sheet. If desired, thermocouples or other sensors can be installed on or near sheet 24 or filter 20 to control the duration and/or current of the electrical energy provided. Alternately, a known current can be applied for a specified time to obtain a desired temperature, the current and time being developed by base line testing generally conducted in a laboratory under controlled conditions. As the activated carbon fiber sheet 24 is heated any contaminants which had been adsorbed are desorbed as the sheet heats to the boiling point temperatures of the respective contaminants.

Further, a third form of heat source 183, shown in FIG. 8, includes the use of wave energy produced by an energy generator 185 located within the desorption portion 187 of the in-line filter system 189, partially shown in FIG. 8, or in the chamber used during the regeneration process (not shown). The energy generator 185 of the preferred embodiment produces waves in the range of 1 mm to 30 cm in wavelength or from several MHZ to ten thousand MHZ frequency. These waves are typically referred to as microwaves. The energy generator of the present invention is not limited to this range of energy waves, and other energy ranges recognized as providing a heat source can also be used and are specifically included within the scope of this disclosure and the claims appended hereto. The most practical frequencies from presently available commercial microwave generators or transmitters are from, but not limited to, approximately 890 to 925 MHZ, and from approximately 2,400 to 2,500 MHZ.

The energy generator 185 (or multiple generators 185A, 185B, and 185C) directs the energy waves toward the filter 20 or the sheet 24 depending upon the control available in a particular embodiment of the in-line filter system or the regeneration chamber depending upon where it is utilized. As the energy waves impinge upon the sheet 24 the temperature is raised to the boiling point of the contaminants which have been adsorbed. As the boiling point is reached the contaminants are desorbed and vaporize such that they can be carried by a low volume air current to a condensation unit or thermal oxidizer as appropriate.

Referring to FIG. 6, there is shown a second preferred embodiment of the present invention. This embodiment utilizes two separate continuous adsorbent fabric sheets which are separated at generally the center of the filter between the upstream plane and the downstream plane. The sheets are positioned at an angle to one another to create a non-laminar flow of the fluid through the filter and provide enhanced contact between the contaminated fluid and the surfaces of the adsorbent fabric sheets. Like parts will be identified by like reference numbers with the addition of 200 to the reference number (e.g. element 20 in the first embodiment being element 220 in the second embodiment).

As shown, adsorbent filter 220 includes a frame 222, a first continuous adsorbent fabric sheet 224, a second continuous adsorbent fabric sheet 225, a first set of supports 226, and a second set of supports 227. Frame 222 of the second embodiment is preferably constructed of the same materials as frame 22. Frame 222 preferably provides members like members 30 through 54 (Not shown for clarity in FIG. 6) of frame 22. Frame 222 further includes intermediate left side member 255, intermediate top member 257, intermediate right side member 259, and intermediate bottom member 261.

Each intermediate member 255 through 261 provides a channel facing the upstream plane 254 for receiving support members 226 and a channel facing the downstream plane 256 for receiving support members 227. In addition to support members for the left and right side, 226L and 226R respectively, support members must be provided for the top 226T and the bottom 226B. Support members 226 are used to support first continuous sheet 224 as it is serpentined at an angle to the members of frame 222. Further, support members 227 are provided for the left (227L), top (227T), right (227R), and bottom (227B) to support a second continuous sheet 225 as it is serpentined at an angle to the members of frame 222 and at an angle to the direction of first continuous sheet 224. While the angles of sheets 224 and 225 are shown to be substantially diagonal within frame 222 and in opposite directions of bias, one skilled in the art will understand that sheets 224 and 225 can be biased from one another at a wide range of angles and can be oriented perpendicular to the side or top members of frame 222 or at any angle in between.

A further alternative noted above which can enhance the non-laminar flow of fluid within filter 20 (or 220) is the use of varying surface texture or weave of the sheet 24. By increasing or decreasing the denier or weight-per-unit-length of the fibers used to create the sheet of activated carbon fiber fabric the coarseness of the fabric can be controlled. If a higher denier fiber is used the fiber will generally be considered to have a larger diameter and thus create a rougher surface when woven then if a lower denier fiber having a smaller diameter is used to weave the fabric. Further, the number of fibers per unit length in the weave can effect the coarseness or smoothness of the surface of the fabric sheet. A larger number of fibers per millimeter necessitates a close weave and therefore a smoother surface. Taken to extremes the fabric of sheet 24 could be a low denier, tight weave approximating silk, or a high denier, loose weave approximating burlap.

Still a further alternative to encourage non-laminar flow is the use of physical mixers which are located at the upstream plane of filter 20. A variety of physical mixers can be used including, but not limited to: a mesh screen; a series of angled louvers; or a series of spiraled tubes arranged in a honeycomb configuration. As noted by the prior examples the physical mixers can be generally one dimensional and act as a defuser as for example the mesh screen, or can be multi-dimensional and act to disrupt the fluid flow (i.e. louvers) and even impart specific directional tendency upon the flow (spiraled tube honeycomb).

The foregoing discussion discloses and describes a preferred embodiment of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. A process for regenerating an adsorbent filter which adsorbs contaminants from a fluid flow, said process comprising the steps of:

removing the filter from a filtration system, the filter being freely exposed to ambient atmosphere upon removal from the filtration system;

installing the filter in a chamber;

heating the filter to a regenerative desorption temperature by way of a heat source wherein the adsorbed contaminants are vaporized and liberated from the filter; and removing said vaporized contaminants from said chamber.

2. The process of claim 1 wherein said chamber is a vacuum chamber being generally sealed and evacuated to create a vacuum after the filter has been installed.

3. The process of claim 1 wherein said heat source is an electric current applied to a continuous sheet of activated carbon fiber fabric of said filter.

4. The process of claim 1 wherein said heat source is an energy generator creating microwaves which are directed at and imparted upon said filter.

5. The process of claim 1 wherein said heat source is an energy generator creating microwave energy which is directed at and imparted upon a continuous sheet of activated carbon fiber fabric of said filter, said continuous sheet of activated carbon fiber fabric being serpentined between supports of said filter.

6. The process of claim 1 wherein said chamber is generally filled with an inert atmosphere.

7. A process for regenerating an adsorbent filter which adsorbs contaminants from a fluid flow, said process comprising the steps of:

removing the filter from a filtration system;

installing the filter in a chamber;

heating the filter to a regenerative desorption temperature by way of a heat source wherein the adsorbed contaminants are vaporized and liberated from the filter;

further heating the filter to a pyrolysis temperature wherein the contaminants are volatilized; and removing said volatilized contaminants from said chamber.

8. The process of claim 7 further comprising the step of:

heating the filter to a carbonization temperature.

9. The process of claim 8 further comprising the steps of:

displacing the existing atmosphere within said chamber with an oxidizing atmosphere; and heating the filter to an activation temperature.

10. A process for regenerating an adsorbent filter which adsorbs contaminants from a fluid flow, said process comprising the steps of:

installing the filter in a chamber;

heating the filter to a regenerative desorption temperature wherein the adsorbed contaminants are vaporized and liberated from the filter;

removing said vaporized contaminants from said chamber;

heating the filter to a pyrolysis temperature wherein the contaminants are volatilized, said pyrolysis temperature being greater than said regenerative desorption temperature;

removing said volatilized contaminants from said chamber;

heating the filter to a carbonization temperature;

displacing the existing atmosphere within said chamber with an oxidizing atmosphere;

heating the filter to an activation temperature in the presence of said oxidizing atmosphere;

removing heat from the filter; and removing the filter from said chamber.

11. An adsorbent filter which adsorbs contaminates from a fluid stream, said filter comprising:

a frame having a first side and a second side;

a first set of supports having one or more first supports therein and being located on said first side of said frame;

a second set of supports having one or more second supports therein and being located on said second side of said frame; and a continuous sheet of adsorbent fabric having a first surface and a second surface, said continuous sheet being located within said frame and extending between alternating first supports and second supports thereby creating two or more cross layers of said continuous sheet, said cross layers being adjacent to one another having a spacing therebetween, said spacing being achieved by applying a tension to said continuous sheet such that the fluid stream passes through said spacing and over at least one of said first surface and said second surface of said continuous sheet wherein the contaminates in the fluid stream are adsorbed by said continuous sheet.

12. The filter of claim 11 wherein said continuous sheet in made of woven fibers which are substantially all activated carbon.

13. The filter of claim 12 wherein said woven fibers are a polymeric material, said fibers being heat decomposed in an inert gas and subsequently activated in a carbon dioxide concentrated atmosphere.

14. The filter of claim 13 wherein said polymeric material is polyacrylonitrile.

15. The filter of claim 12 wherein said woven fibers are selected from a group consisting of polyacrylonitrile, rayon, pitch, phenol, lingin, and saran.

16. An adsorbent filter which adsorbs contaminates from a fluid stream, said filter comprising:

a frame;

a first continuous sheet of adsorbent fabric having a surface; and means attached to said frame for supporting said first continuous sheet of adsorbent fabric and redirecting said first continuous sheet under a tension sufficient to create one or more flow channels, such that the fluid stream flows through said flow channels and along said surface of said sheet wherein the contaminates in the fluid stream are adsorbed by said sheet.

17. The filter of claim 16 wherein said means for supporting includes a first set of supports and a second set of supports, said first set of supports and said second set of supports being generally opposite one another and extend at least partially from an upstream plane of said frame to a downstream plane of said frame with said continuous sheet extending alternatingly between said first set of supports and said second set of supports.

18. An adsorbent filter which adsorbs contaminates from a fluid stream, said filter comprising:

a frame;

a first continuous sheet of adsorbent fabric having a surface;

means attached to said frame for supporting said first continuous sheet of adsorbent fabric such that the fluid stream flows along said surface of said sheet such that the contaminates in the fluid stream are adsorbed by said sheet;

a second continuous sheet of adsorbent fabric having a surface; and means attached to said frame for supporting said second continuous sheet of adsorbent fabric such that the fluid stream flows along said surface of said first sheet prior to flowing along said surface of said second sheet.

19. The filter of claim 18 wherein said means for supporting includes a first set of supports and a second set of supports for supporting said first continuous sheet, and a third set of supports and a fourth set of supports for supporting said second continuous sheet, said first set of supports and said second set of supports being generally opposite one another and extending at least partially from an upstream plane of said frame to a downstream plane of said frame with said first continuous sheet extending alternatingly between said first set of supports and said second set of supports, and said third set of supports and said fourth set of supports being generally opposite one another and extending substantially the remainder of the distance from said upstream plane to said downstream plane with said second continuous sheet extending alternatingly between said third set of supports and said fourth set of supports.

20. The filter of claim 18 wherein said frame includes an upstream plane and a downstream plane and said surface of said first continuous sheet and said surface of said second continuous sheet are positioned at an angle to one another relative to said upstream plane and said downstream plane of said frame.

21. An adsorbent filter which adsorbs contaminates from a fluid stream, said filter comprising:

a frame;

a plurality of supports generally parallel to the direction of flow of the fluid stream; and a continuous sheet of adsorbent fabric having a first surface and a second surface, said sheet being located within said frame and serpentined between said supports to form two or more cross layers of said sheet, said sheet being under a tension sufficient to maintain said cross layers in a substantially planar condition, and forming flow channels between said cross layers in which the fluid stream flows along said surfaces of said sheet such that the contaminates in the fluid stream are adsorbed by said sheet.

22. The filter of claim 21 wherein a first dimension of said flow channels is determined by one dimension of said plurality of supports, and a second dimension of said flow channel is determined by a distance between said supports as said sheet is serpentined therebetween.

23. The filter of claim 22 wherein said supports are two or more sets of elongated rods.

24. The filter of claim 23 wherein said elongated rods are substantially circular in cross section, said one dimension of said supports being the diameter of said rod.

* * * * *